United States Patent [19]

Inagaki et al.

[11] Patent Number: 5,494,345
[45] Date of Patent: Feb. 27, 1996

[54] BRAKE CONTROL APPARATUS FOR AUTOMOTIVE VEHICLE THAT INCLUDES FEEDFOWARD/FEEDBACK MIXING DEVICE

[75] Inventors: Shoji Inagaki; Masaki Yamamoto, both of Susono; Noriaki Hattori, Anjo; Kenji Tozu, Kariya; Jun Mihara, Toyoake; Takayuki Itoh, Nagoya; Shingo Sugiura; Norio Yamazaki, both of Kariya, all of Japan

[73] Assignees: Aishin Seiki Kabushiki Kaisha; Toyota Jidosha Kabushiki Kaisha, both of Aichi, Japan

[21] Appl. No.: 323,722

[22] Filed: Oct. 18, 1994

[30] Foreign Application Priority Data

Oct. 26, 1993 [JP] Japan .................... 5-267375

[51] Int. Cl.⁶ .................................................. B60T 8/32
[52] U.S. Cl. ....................... 303/163; 303/165; 303/20
[58] Field of Search ......................... 303/102, 103, 303/104, 92, 100, 105, 107, 108, 109, 110, 111, 95, 20, 163, 164, 165, 149, 150, 155, 156, 157, 159; 180/197; 188/181 A, 181 R; 364/426.01, 426.02, 426.03

[56] References Cited

U.S. PATENT DOCUMENTS

| | | | |
|---|---|---|---|
| 4,743,072 | 5/1988 | Brearley | 303/20 |
| 5,043,896 | 8/1991 | Sol | 303/95 |
| 5,176,444 | 1/1993 | Kageyama et al. | 303/163 |

FOREIGN PATENT DOCUMENTS

| | | |
|---|---|---|
| 2-306863 | 12/1990 | Japan . |
| 3-500868 | 2/1991 | Japan . |
| 3-182861 | 8/1991 | Japan . |
| 4-135954 | 5/1992 | Japan . |
| 4-257756 | 9/1992 | Japan . |
| 4-287753 | 10/1992 | Japan . |
| 5-502422 | 4/1993 | Japan . |
| 5-502423 | 4/1993 | Japan . |
| 5-501693 | 4/1993 | Japan . |

*Primary Examiner*—Douglas C. Butler
*Attorney, Agent, or Firm*—Oliff & Berridge

[57] ABSTRACT

In an electric control apparatus for a hydraulic brake control system of a vehicle, a feedback control portion is provided to produce a feedback control pulse signal indicative of a difference between a target slip ratio and an actual slip ratio. A feedforward control portion is provided to successively convert the target slip ratio in relation to a required braking force, a hydraulic braking pressure and an amount of hydraulic braking fluid, in sequence, and to convert the amount of hydraulic braking fluid into a feedforward control pulse signal. A pulse mixing circuit is connected to control portions to mix the control pulse signals for producing a mixed control pulse signal as a distinct control pulse signal. A driving circuit is connected to the pulse mixing circuit to control a hydraulic braking pressure applied to each wheel of the vehicle in accordance with the control pulse signal, regardless of the extent to which a brake pedal of the vehicle is depressed.

6 Claims, 9 Drawing Sheets

Fig. 3
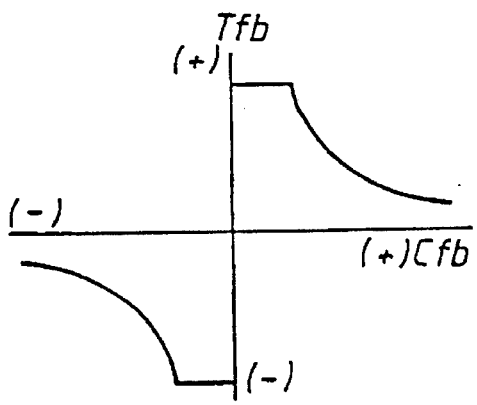
Fig. 4
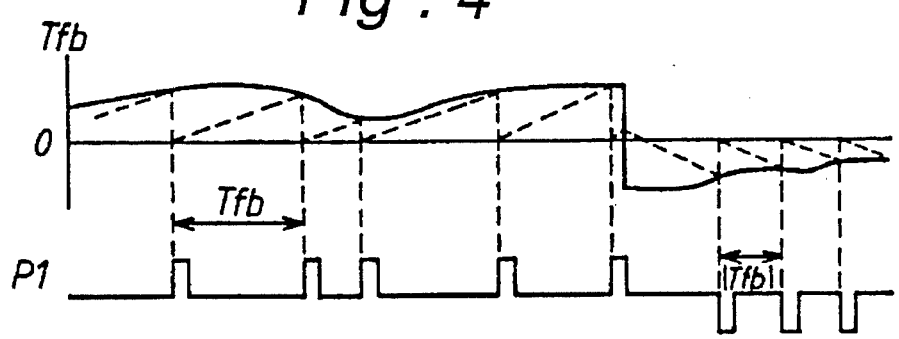
Fig. 5(A)     Fig. 5(B)
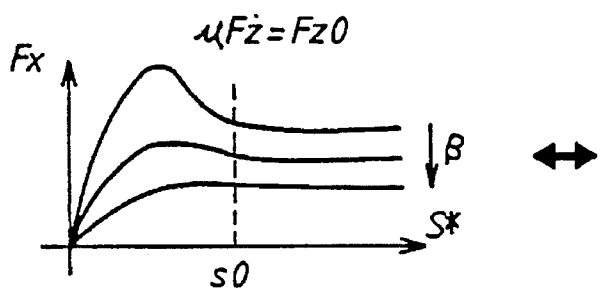  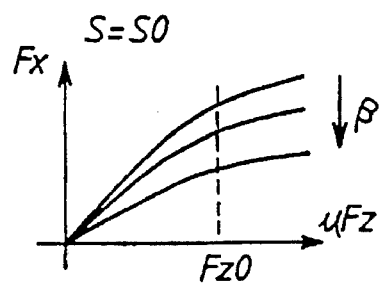

BRAKE CONTROL APPARATUS FOR AUTOMOTIVE VEHICLE THAT INCLUDES FEEDFOWARD/FEEDBACK MIXING DEVICE

BACKGROUND OF THE INVENTION

1. Field of the Invention

The present invention relates to a brake control apparatus for automotive vehicles for normalizing abnormal behavior of the vehicle such as spin, drift out or the like.

2. Description of the Prior Art

In a conventional brake control apparatus of this kind as disclosed in Japanese Patent Laid-open Publication No. 4-257756, a target slip ratio of road wheels is determined in accordance with movement condition of the vehicle, and an actual slip ratio of the road wheel is detected to produce a feedback control signal In accordance with a difference between the target slip ratio and the actual slip ratio. The feedback control signal is applied to a hydraulic brake control system for control of hydraulic braking fluid supplied to each slave cylinder of the road wheels. Thus, the hydraulic brake control system is controlled by the feedback control signal in such a manner that the actual slip ratio of the road wheel becomes identical with the target slip ratio.

In the conventional brake control apparatus, however, a quick control response of the hydraulic brake control system may not be effected under such a feedback control as described above, and the hydraulic brake control system may not be controlled in accordance with road surface conditions. For this reason, it is unable to quickly normalize abnormal behavior of the vehicle in a high precision.

SUMMARY OF THE INVENTION

It is, therefore, a primary object of the present invention to provide a brake control apparatus for automotive vehicles in which a feedforward control is adapted to quickly normalize abnormal behavior of the vehicle in a high precision.

According to the present invention, the primary object is accomplished by providing an electric control apparatus for a hydraulic brake control system of an automotive vehicle, comprising determination means for determining a target slip ratio of each road wheel of the vehicle in accordance with a movement condition of the vehicle, detection means for detecting an actual slip ratio of each road wheel of the vehicle, and feedback control means for producing a feedback control signal indicative of a difference between the target slip ratio and the actual slip ratio and for controlling the hydraulic brake control system in response to the feedback control signal so that the actual slip ratio becomes identical with the target slip ratio, wherein the electric control apparatus further comprises feedforward control means for producing a feedforward control signal in accordance with the target slip ratio and mixing means for mixing the feedforward control signal with the feedback control signal and for controlling the hydraulic brake control system in accordance with the mixed control signal.

According to an aspect of the present invention, the electric control apparatus further comprises means for interpolating the feedback control signal in accordance with a road surface condition and means for interpolating the feedforward control signal in accordance with the road surface condition.

According to another aspect of the present invention, the electric control apparatus further comprises means for decreasing a gain of the feedback control signal when the target slip ratio or the actual slip ratio is in a low value and for increasing the gain of the feedback control signal when the target slip ratio or the actual slip ratio is in a high value.

According to a further aspect of the present invention, the electric control apparatus further comprises means for effecting a feedforward control of the hydraulic brake control system under control of the feedforward control means when the target slip ratio or the actual slip ratio is in a low value.

In a practical embodiment of the present invention, it is preferable that the feedback control means includes a pulse generator for producing a pulse signal the pulse interval of which is reduced In accordance with an increase of the feedback control amount, while the feedforward control means includes a pulse converter for producing a pulse signal the pulse interval of which is reduced in accordance with an increase of variation speed of the feedforward amount. In this arrangement, the production timing of the pulse signal at the pulse generator is varied by the pulse signal from the pulse converter in such a manner that the production timing of the former pulse signal does not become identical with the production timing of the latter pulse signal.

BRIEF DESCRIPTION OF THE DRAWINGS

Other objects, features and advantages of the present invention will be more readily appreciated from the following detailed description of a preferred embodiment thereof when taken together with the accompanying drawings, in which:

FIG. 3 is a graph showing an interval time Tfb in relation to a feedback control signal Cfb;

FIG. 4 Is a time chart of a feedback control pulse signal produced by a pulse generator shown in FIG. 2;

FIGS. 5(A) and 5(B) each are a graph showing a relationship among a multiplied value of a road surface frictional coefficient $\mu$ and a contact load Fz, a slip ratio S, a tire slip angle $\beta$, and a required braking force Fx;

DESCRIPTION OF THE PREFERRED EMBODIMENT

Figure 1:
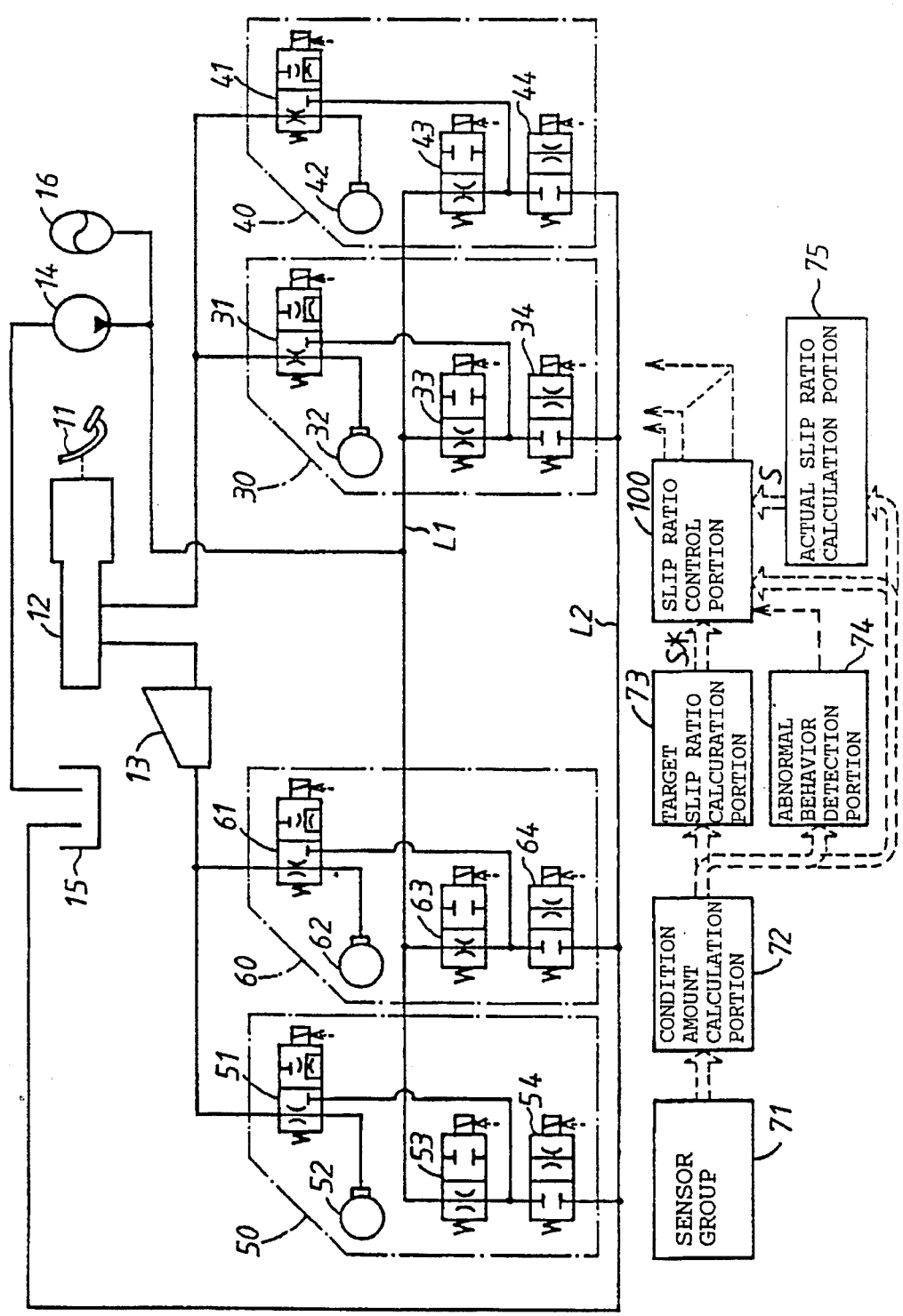
FIG. 1 is a block diagram of an electric control apparatus for a hydraulic brake control system in an automotive vehicle.

In FIG. 1 of the drawings, there are schematically illustrated a hydraulic brake control system of an automotive vehicle and a block diagram of an electric control apparatus for the hydraulic brake control system. The hydraulic brake control system includes a master cylinder 12 arranged to be operated by depression of a brake pedal 11. The master cylinder 12 has a first port connected to slave cylinders 32, 42 of left and right front road wheels through solenoid valves 31, 41 and a second port connected to slave cylinders 52, 62 of left and right rear road wheels through a proportioning valve 13 and solenoid valves 51, 61. The hydraulic brake control system further includes a hydraulic pump 14 arranged to pump out hydraulic fluid from a fluid reservoir 15 and to supply the hydraulic fluid under pressure to a high pressure line L1. The high pressure line L1 is provided with an accumulator 16 for accumulating the hydraulic fluid under pressure. Disposed between the high pressure line L1 and a low pressure line L2 in connection to the fluid reservoir 15 are braking pressure control devices 30, 40, 50, 60 for the front and rear road wheels.

The braking pressure control device 30 for the left front road wheel includes the solenoid valve 31, the slave cylinder 32, a pressure increasing solenoid valve 33 and a pressure reducing solenoid valve 34. The pressure increasing solenoid valve 33 is arranged to communicate the high pressure line L1 to the slave cylinder 32 when it is retained in a first position shown in the figure in a condition where the solenoid valve 31 has been switched over to a second position from a first position shown in the figure. When switched over to a second position from the first position, the solenoid valve 33 interrupts the fluid communication between the high pressure line L1 and the slave cylinder 32. The pressure reducing solenoid valve 34 is arranged to communicate the slave cylinder 32 with the low pressure line L2 when it is switched over to a second position from a first position shown in the figure in a condition where the solenoid valves 31, 33 have been switched over to their second positions. When retained in the first position, the solenoid valve 34 interrupts the fluid communication between the slave cylinder 32 and the low pressure line L2.

The braking pressure control device 40 for the right front road wheel includes the solenoid valve 41, the slave cylinder 42, a pressure increasing solenoid valve 43 and a pressure reducing solenoid valve 44 which are arranged in the same manner as in the braking pressure control device 30. Similarly, the braking pressure control device 50 for the left rear road wheel includes the solenoid valve 51, the slave cylinder 52, a pressure increasing solenoid valve 53 and a pressure reducing solenoid valve 54 which are arranged in the same manner as in the braking pressure control device 30. The braking pressure control device 60 for the right rear road wheel includes the solenoid valve 61, the slave cylinder 62, a pressure increasing solenoid valve 63 and a pressure reducing solenoid valve 64 which are arranged in the same manner as in the braking pressure control device 30. In this embodiment, all the solenoid valves are retained in their first positions when they are deenergized and switched over from their first positions to their second positions when they are energized.

The electric control apparatus for control of the solenoid valves includes a sensor group 71 composed of a plurality of sensors respectively for detecting a steering angle Θh of the vehicle steering wheel, a longitudinal velocity Ux, a lateral velocity Uy, a longitudinal acceleration Gx, a lateral acceleration Gy, a yaw rate Yr, each rotational angular speed ωfl, ωfr, ωrl, ωrr of the front and rear road wheels, a throttle opening degree Θs and operation of the brake pedal Br. The sensor group 71 is connected to a condition amount calculation portion 72 which is designed to produce an output signal indicative of a movement condition amount detected by the sensors and to estimate each actual steering angle Stafl, Stafr of the front road wheels, a moving speed Us, each wheel speed Usfl, Usfr, Usrl, Usrr of the front and rear road wheels, each slip angle βfl, βfr, βrl, βrr of the front and rear road wheels, a slip angle βg and a road surface frictional coefficient μ on a basis of the detected movement condition amount for producing an output signal indicative of the estimated condition amount.

The condition amount calculation portion 72 is connected to a target slip ratio calculation portion 73, an abnormal behavior detection portion 74 and an actual slip ratio calculation portion 75. The target slip ratio calculation portion 73 is designed to determine each target slip ratio Sfl*, Sfr*. Srl*, Srr* based upon the steering angle Θh, longitudinal acceleration Gx, lateral acceleration Gy, throttle opening degree Θs, operation of the brake pedal Br, each slip angle βfl, βfr, βrl, βrr of the front and rear road wheels, and slip angle βg. In this embodiment, the respective target slip ratios Sfl*, Sfr*, Srl* Srr* of the front and rear road wheels are defined to normalize abnormal behavior of the vehicle and stabilize the travel of the vehicle. The calculation method of the target slip ratios Sfl*, Sfr*, Srl*, Srr* is described in detail in Japanese Patent Laid-open Publication 4-257756 discussed in the introductory portion. The abnormal behavior detection portion 74 is designed to estimate behavior of the vehicle (a synthetic movement condition of the vehicle) based upon the detection signals applied thereto from the condition amount calculation portion 72 thereby to produce an abnormal signal in the occurrence of abnormal movement of the vehicle. The actual slip ratio calculation portion 75 is designed to execute calculation of the following equations (1) for calculating each actual slip ratio Sfl, Sfr, Srl, Srr of the road wheels based upon each rotational angular speed ωfl, ωfr, ωrl, ωrr of the front and rear road wheels, each speed Usfl, Usfr, Usrl, Usrr of the front and rear road wheels and each load radius R (a fixed value) applied from the condition amount calculation portion 72

$$Sfl=(Usfl-R\cdot\omega fl)/Usfl$$

$$Sfr=(Usfr-R\cdot\omega fr)/Usfr$$

$$Srl=(Usrl-R\cdot\omega rl)/Usrl$$

$$Srr=(Usrr-R\cdot\omega rr)/Usrr \quad (1)$$

Electric signals respectively indicative of the target slip ratios Sfl*, Sfr*, Srl*, Srr*, abnormal behavior of the vehicle and the actual slip ratios Sfl, Sfr, Srl, Srr are applied to the slip ratio control portion 100.

Figure 2:
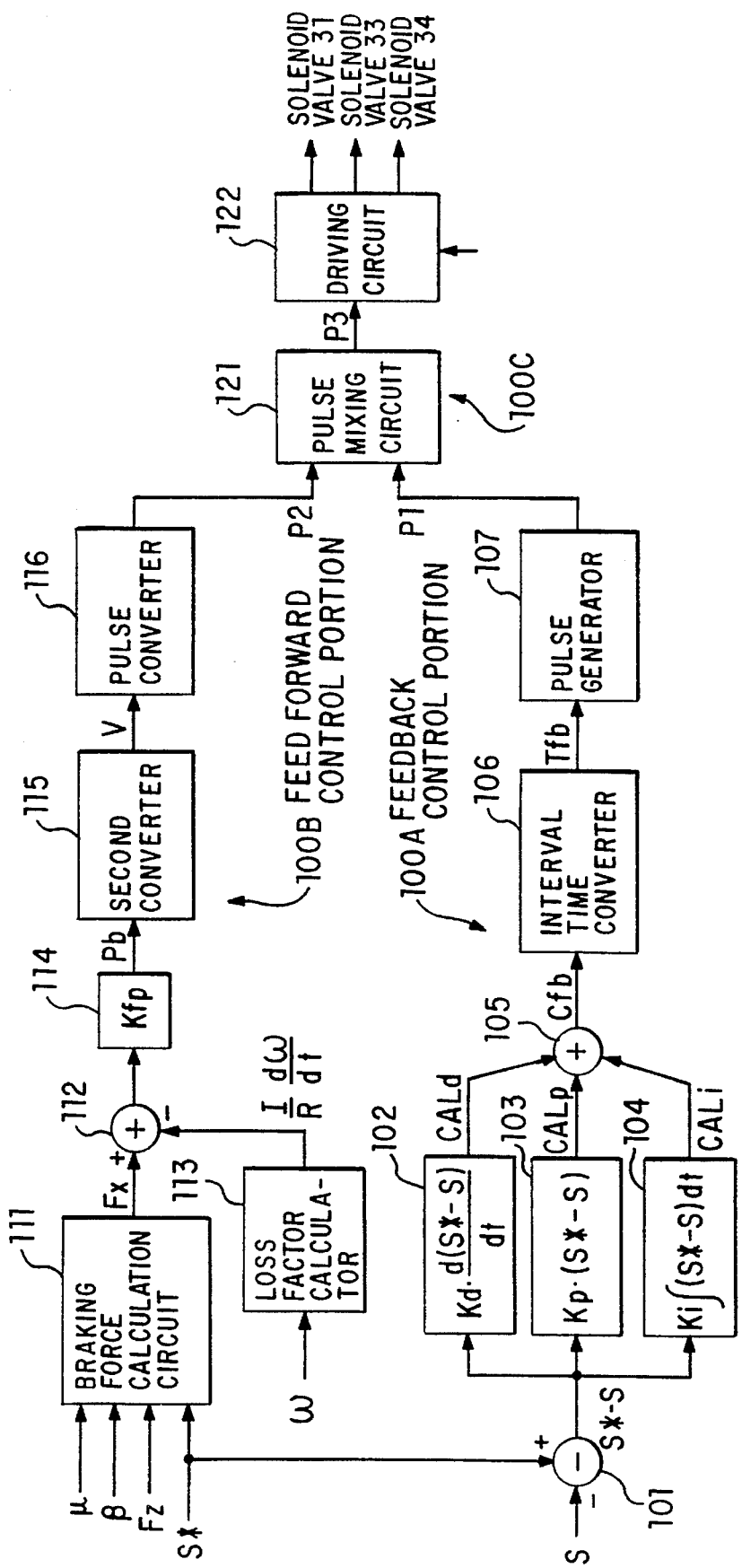
FIG. 2 is a block diagram of a slip ratio control portion shown in FIG. 1.

When applied with the electric signal indicative of the abnormal behavior of the vehicle, the slip ratio control portion 100 acts to control the respective solenoid valves of the brake control devices 30, 40, 50, 60 in accordance with the actual slip ratios Sfl, Sfr, Srl, Srr and target slip ratios Sfl*, Sfr*, Srl*, Srr* in such a manner that the actual slip ratios Sfl, Sfr, Srl, Srr become identical with the target slip ratios Sfl*, Sfr*, Srl*, Srr*. As shown in FIG. 2, the target slip ratio control portion 100 includes a feedback control portion 100A, a feedforward control portion 100B and an output portion 100C which are provided for each road wheel of the vehicle. Since the feedback control portion 100A, feedfoward portion 100B and output portion 100C for each road wheel of the vehicle are substantially the same, only the brake control of the left front wheel will be described as an example hereinafter, and the target slip ratio Sfl* and actual slip ratio Sfl are represented as slip ratios S* and S.

The feedback control portion 100A includes a subtracter 101 for calculating a difference between the target slip ratio S* and actual slip ratio S. The subtracter 101 is connected to a differential control term calculator 102, a proportional control term calculator 103 and an integral control term calculator 104 which are connected in parallel to one another for realizing a well-known PID feedback control. The calculators 102, 103 and 104 are arranged to execute calculation of the following equations (2) for producing output signals respectively indicative of calculation results CALd, CALp, CALi.

$$CALd=Kd\cdot d(S^*-S)/dt$$

$$CALp=Kp\cdot(S^*-S)$$

$$CALi=Ki\cdot\int(S^*-S)dt \quad (2)$$

where the coefficients Kd, Kp, Ki each are a predetermined constant.

The output signals indicative of calculation results CALd, CALp, CALi are applied to an adder 105 which acts to calculate a sum of the calculation results CALd, CALp, CALi and to apply the calculated sum as a feedback control signal Cfb to an interval time converter 106. The interval time converter 106 has a characteristic table shown in FIG. 3 and acts to convert the feedback control signal Cfb into an interval signal Tfb indicative of a pulse duration (a time interval) and to apply the interval signal Tfb to a pulse generator 107. The pulse generator 107 includes a counter, a comparator and a one-shot circuit which are arranged to produce a control pulse signal P1 of a predetermined pulse width at each time interval represented by the interval signal Tfb. If the interval signal Tfb is positive as shown in FIG. 4, a positive control pulse signal P1 of the predetermined width is produced by the comparator and one-shot circuit when a time defined by the interval signal Tfb has been measured by the counter. If the interval signal Tfb is negative, a negative pulse signal P1 of the predetermined width is produced by the comparator and one-shot circuit when a time defined by the interval signal Tfb has been measured by the counter. Thus, the feedback control portion 100A produces a feedback control pulse signal P1 of the predetermined width the time interval of which is inversely proportional to an absolute value of a difference S*−S between the target slip ratio S* and actual slip ratio S and the sign of which corresponds with a positive or negative sign of the difference S*−S.

As shown in FIG. 2, the feedforward control portion 100B has a braking force calculation circuit 111 which is applied with electric signals respectively indicative of the target slip ratio S*, the road surface coefficient μ, the tire slip angle β identical with the foregoing slip angle βfl and a contact load Fz for determining a braking force Fx necessary for the left front road wheel. The braking force calculation circuit 111 includes a calculator and a four dimensional table representing a relationship of variables S*, μ·Fz, μ, β, Fx as shown in FIG. 5(A) or 5(B). The braking force calculation circuit 111 calculates a multiplied value μ·Fz of the road surface frictional coefficient μ and the contact load Fz and refers to the four dimensional table to calculate a braking force Fx based upon the multiplied value μ·Fz, target slip ratio S* and tire slip angle β. The braking force calculation circuit 111 further interpolates the braking force to determine a final braking force Fx. Although in this embodiment the four dimensional table has been adapted to determine the braking force Fx, a neural network calculation may be adapted to determine the braking force Fx on a basis of the variables S*, μ·Fz, μ and β.

A subtracter 112 is connected to the braking force calculation circuit 111 to be applied with an electric signal indicative of the braking force Fx, and a loss factor calculator 113 is connected to the condition amount calculation portion 72 to be applied with an electric signal indicative of the rotation angle speed ω identical with the foregoing wheel rotation angle speed ωfl. The loss factor calculator 113 is arranged to execute calculation of the following equation (3) for calculating a loss factor ΔFx caused by a rotational moment of the road wheels.

$$\Delta Fx=(I/R)\cdot d\omega/dt \quad (3)$$

where I is a rotational moment of inertia, and R is a dynamic loaded radius. In this instance, the rotational moment of inertia I and dynamic loaded radius R each are preliminarily determined as a constant.

Figure 6:
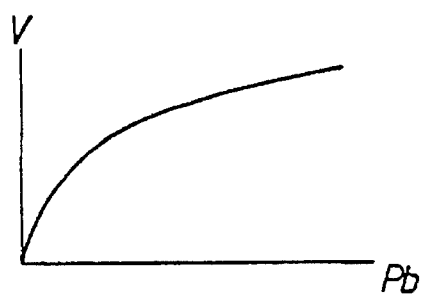
FIG. 6 is a graph showing an amount of hydraulic fluid V in relation to a hydraulic braking pressure Pb.
Figure 7:
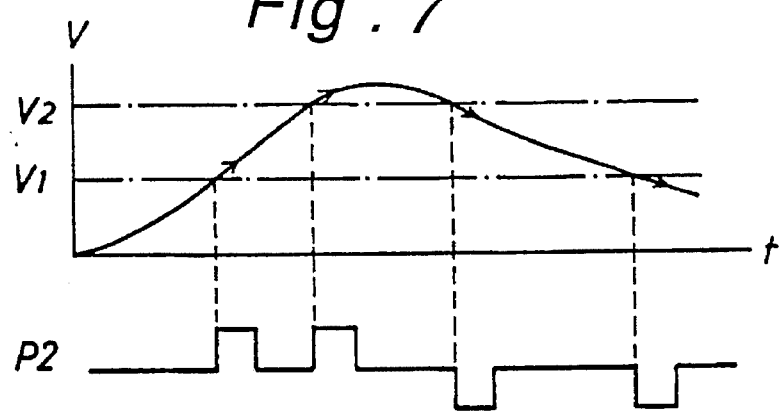
FIG. 7 is a time chart of a feedforward control pulse signal produced by a pulse converter shown in FIG. 2.

When applied with electric signals respectively indicative of the braking force Fx and the loss factor ΔFx, the subtracter 112 subtracts the loss factor ΔFx from the braking force Fx. A first converter 114 is connected to the subtracter 112 to be applied with an electric signal indicative of the braking force Fx compensated by the subtraction. The first converter 114 is designed to multiply the braking force Fx by a coefficient Kfp for calculation of a required hydraulic braking pressure Pb, the coefficient representing a ratio of a hydraulic braking pressure relative to a braking force. A second converter 115 is connected to the first converter 114 to be applied with an electric signal indicative of the required hydraulic braking pressure Pb. The second converter 115 has a table representing a relationship between the required hydraulic braking pressure Pb and an amount of hydraulic fluid V necessary for effecting the required hydraulic braking pressure Pb. (see FIG. 6) Based on the table of FIG. 6, the second converter 115 calculates an amount of hydraulic fluid V necessary for the required hydraulic braking pressure Pb. A pulse converter 116 is connected to the second converter 115 to be applied with an electric signal indicative of the calculated amount of hydraulic fluid V. The pulse converter 116 includes a comparator and a pulse generator. As shown in FIG. 7, the pulse generator of the pulse converter 116 produces a feedfoward control pulse signal P2 of a predetermined width when the comparator detected the fact that the calculated amount of hydraulic fluid V exceeded reference values V1 and V2. In this instance, the pulse generator produces a positive control pulse signal P2 therefrom when the amount of hydraulic fluid is increased and produces a negative control pulse signal P2 therefrom when the amount of hydraulic fluid is decreased. Although in FIG. 7 only the two reference values V1 and V2 have been adapted, a number of reference values are adapted in actual practice of the present invention.

Figure 8:
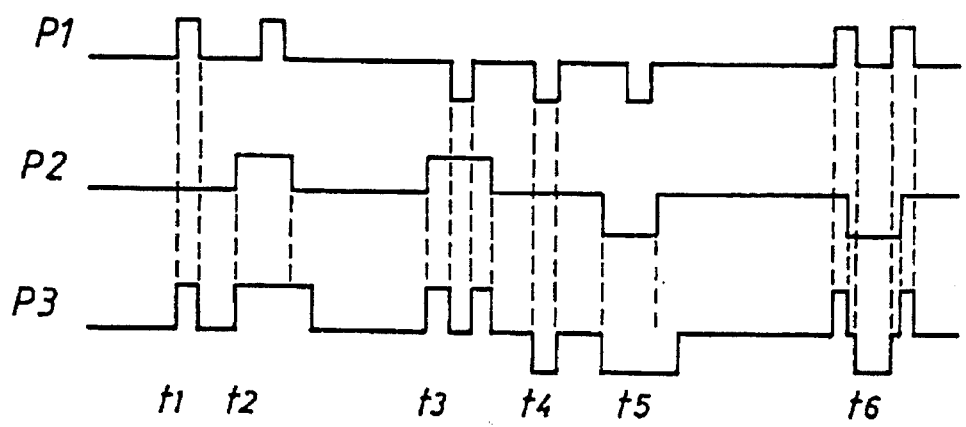
FIG. 8 is a time chart of a feedback control pulse signal P1, a feedforward control pulse signal P2 and a mixed control pulse signal P3.

The output portion 100c includes a pulse mixing circuit 121 arranged to be applied with the feedback control pulse signal P1 from the feedback control portion 100A and the feedforward control pulse signal P2 from the feedforward control portion 100B. The pulse mixing circuit 121 is designed to logically mix the control pulse signals P1 and P2 for producing a control pulse signal P3 as follows:

1) When applied with either one of the control pulse signals P1 and P2, the pulse mixing circuit 121 produces the applied control pulse signal as the control pulse signal P3 at times t1, t4 shown in FIG. 8.

2) When applied with both the control pulse signals P1 and P2 at an identical sign, the pulse mixing circuit 121 produces a sum of the control pulse signals P1, P2 as the control pulse signal P3 at times t2, t5 shown in FIG. 8.

3) When applied with both the control pulse signals P1 and P2 at a different sign, the pulse mixing circuit 121 produces a difference of the control pulse signals P1, P2 as the control pulse signal P3 at times t3, t6 shown in FIG. 8.

The pulse mixing circuit 121 is connected to a driving circuit 122 which is arranged to energize the solenoid valves 31 in response to an electric signal indicative of an abnormal behavior of the vehicle applied from the abnormal behavior detection portion 74 and to energize or deenergize the solenoid valves 33, 34 when applied with the control pulse signal P3 in a condition where the solenoid valve 31 is being energized. If the control pulse signal P3 does not occur in a condition where the solenoid valve 31 is being energized, the driving circuit 122 energizes the solenoid valve 33 to switch over the same from the first position to the second position and deenergizes the solenoid valve 34 to retain the same in the first position. When applied with the positive control pulse signal P3 from the pulse mixing circuit 121, the driving circuit 122 deenergizes both the solenoid valves 33, 34 to retain them in their first positions. When applied with the negative control pulse signal P3, the driving circuit 122 energizes both the solenoid valves 33, 34 to switch over them from their first positions to their second positions. If the signal indicative of abnormal behavior of the vehicle does not occur, the driving circuit 122 deenergizes all the solenoid valves 31, 33, 34 to retain them in their first positions as shown in the figure.

Hereinafter, operation of the embodiment will be described in detail. Assuming that the brake pedal 11 has been depressed by a driver during travel of the vehicle, the master cylinder 12 is operated to produce hydraulic braking pressure. If in this instance the behavior of the vehicle is normal, all the solenoid valves are retained in their first positions as shown in the figure. Thus, the hydraulic braking pressure is applied to the slave cylinders 32, 42 through the solenoid valves 31, 41 and applied to the slave cylinders 52, 62 through the proportioning valve 14 and solenoid valves 51, 61. As a result, the road wheels are applied with a braking force in accordance with depression of the brake pedal to brake the vehicle.

In the occurrence of abnormal behavior of the vehicle, the abnormal behavior detection portion 74 detects the abnormal behavior of the vehicle and applies an electric abnormal signal indicative of the abnormal behavior to the slip ratio control portion 100. In the slip ratio control portion 100, the driving circuit 122 energizes the solenoid valves 31, 41, 51, 61 in response to the abnormal signal to switch over them from their first positions to their second positions. Thus, the slave cylinders 32, 42, 52, 62 are disconnected from the master cylinder 12 and applied with hydraulic fluid under pressures from the high pressure line L1 under control of the solenoid valves 33, 34; 43, 44; 53, 54; 63, 64.

Under such a condition as described above, the slip ratio control portion 100 is applied with electric signals respectively indicative of a target slip ratio S* and actual slip ratio S from the target slip ratio calculation portion 73 and actual slip ratio calculation portion 75. In this instance, the slip ratio control portion 100 applies a feedback control pulse signal P1 indicative of a difference S* −S of the slip ratios S* and S as a control pulse signal P3 to the driving circuit 122 through the pulse mixing circuit 121. If the difference S* −S is positive, the control pulse signal P3 is applied as a plurality of positive pulses of the predetermined width, and each interval time (duration) of the positive pulses becomes short in accordance with increase of an absolute value of the difference S* −S. Thus, the driving circuit 122 acts to retain the solenoid valves 33, 34 in their first positions in the occurrence of the positive control pulse signal P3.

If there is not any positive control pulse signal P3, the driving circuit 122 acts to switch over the solenoid valve 33 from the first position to the second position and to retain the solenoid valve 34 in the first position. This causes the hydraulic braking pressure in the slave cylinder 32 to increase in proportion to the absolute value of the difference S* −S. If the difference S* −S is negative, the control pulse signal P3 is applied as a plurality of negative pulses of the predetermined width, and each interval time (duration) of the negative pulses becomes short in accordance with increase of an absolute value of the difference S* −S. Thus, the driving circuit 122 acts to switch over both the solenoid valves 33, 34 from their first positions to their second positions in the occurrence of the negative control pulse signal P3. If there is not any negative control pulse signal P3, the driving circuit 122 acts to switch over the solenoid valve 33 from the first position to the second position and to retain the solenoid valve 34 in the first position. This causes the hydraulic braking pressure in the slave cylinder 32 to decrease at a speed proportional to the absolute value of the difference S* −S. As a result, the slip ratio of the left front road wheel is controlled to converge into the target slip ratio S*.

Simultaneously, the feedforward control portion 100B applies a feedforward control pulse signal P2 to the pulse mixing circuit 121 in accordance with the target slip ratio S*. In this instance, an amount of hydraulic fluid V corresponding with the target ratio S* is calculated. If the calculated amount of hydraulic fluid V increases, the control pulse signal P2 is produced as a plurality of positive pulses of the predetermined width, and each interval time (duration) of the positive pulses becomes short in accordance with the increasing speed of the amount of hydraulic fluid V. If the calculated amount of hydraulic fluid decreases, the control pulse signal P2 is produced as a plurality of negative pulses of the predetermined width, and each interval time (duration) of the negative pulses becomes short in accordance with the decreasing speed of the amount of hydraulic fluid. The feedforward control pulse signal P2 is mixed with the feedback control pulse signal P1 at the pulse mixing circuit 121.

If the feedforward control pulse signal P2 is not overlapped with the feedback control pulse signal P1 at the pulse mixing circuit 121, the feedforward control pulse signal P2 is applied to the driving circuit 122. If the feedforward control pulse signal P2 is overlapped with the feedback control pulse signal P1 at an identical sign, a time width of the overlapped portion is added to the pulse width of the control pulse signal P1 or P2, and a control pulse signal P3 of the added pulse width is applied to the driving circuit 122. If the feedforward control pulse signal P2 is overlapped with the feedback control pulse signal P1 at a different sign, the control pulse signal P1 or P2 is applied as the control pulse signal P3 to the driving circuit 122. When applied with the control pulse signal P3, the driving circuit 122 energizes or deenergizes the solenoid valves 33, 34 as described above. As a result, the hydraulic pressure in the slave cylinder 32 is regulated by the feedback control and/or the feedforward control. In addition, the hydraulic pressure in the other slave cylinders is controlled substantially in the same manner as in the slave cylinder 32.

Since in this embodiment the feedforward control is added to the feedback control to converge each actual slip ratio S of the road wheels into the target slip ratio S*, the abnormal behavior of the vehicle can be quickly normalized in a high precision.

Figure 9:
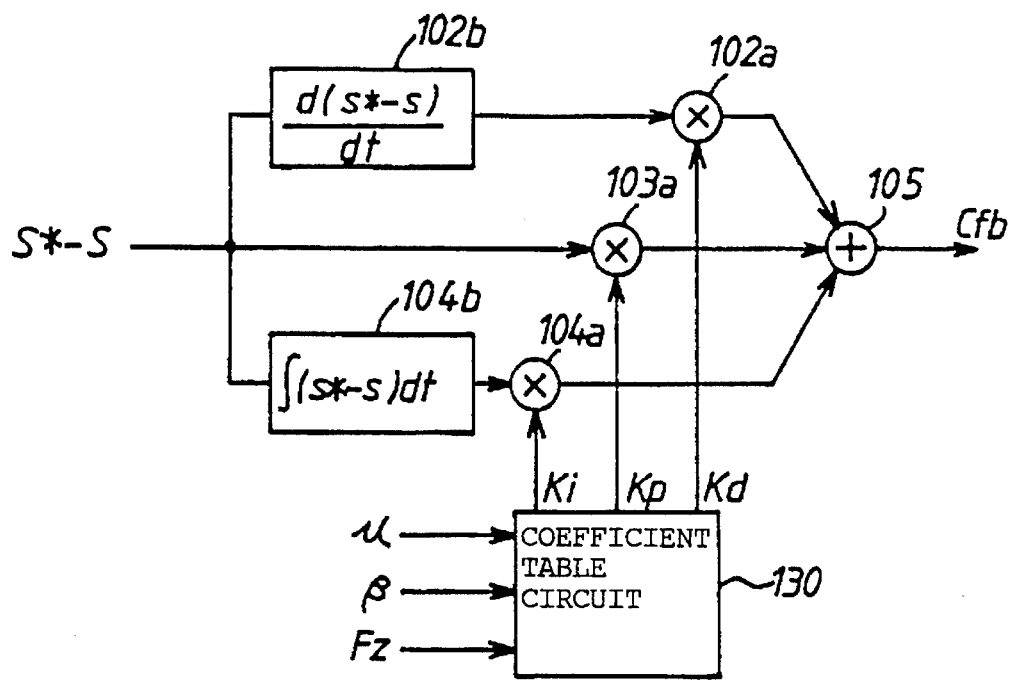
FIG. 9 is a block diagram of a first modification of the feedback control portion shown in FIG. 2.
Figure 10:
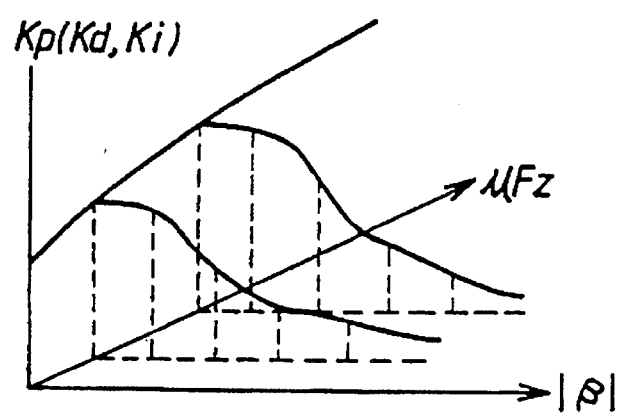
FIG. 10 is a graph showing a relationship among a multiplied value of a road surface frictional coefficient $\mu$ and a contact load Fz, a tire slip angle $\beta$ and coefficients Kp, Kd, Ki in the modification shown in FIG. 9.

In actual practices of the present invention, the above embodiment may be modified as described below.

a) First Modification:

In a first modification of the embodiment, the differential control term calculator 102, proportional control term calculator 103 and integral control term calculator 104 are modified as shown in FIG. 9. In this modification, there is provided a coefficient table circuit 130 which is arranged to memorize a three dimensional map representing coefficients Kp, Kd, Ki in relation to the detected road surface frictional coefficient µ, a predetermined contact load Fz and a tire slip angle as shown in FIG. 10. In addition, the coefficient table circuit 130 includes a multiplexer for multiplying the road surface frictional coefficient µ by the contact load Fz and an interpolator for interpolating an output of the table circuit. The coefficients Kp, Kd, Ki from the coefficient table circuit 130 are applied to multiplexers 102a, 103a and 104a. The multiplexer 102a is arranged to multiply the coefficient Kd by a differentiated value d(S* −S)/dt of a difference between the target slip ratio S* and actual slip ratio S calculated at the differentiator 102b and to apply the multiplied value to an adder 105. The multiplexer 103a multiplies the difference S* −S by the coefficient Kp and applies the multiplied value to the adder 105. The multiplexer 104a multiplies an integrated value (S* −S)dt of the difference S* −S calculated at the multiplexer 104b by the coefficient Ki and applies the multiplied value to the adder 105.

Figure 11:
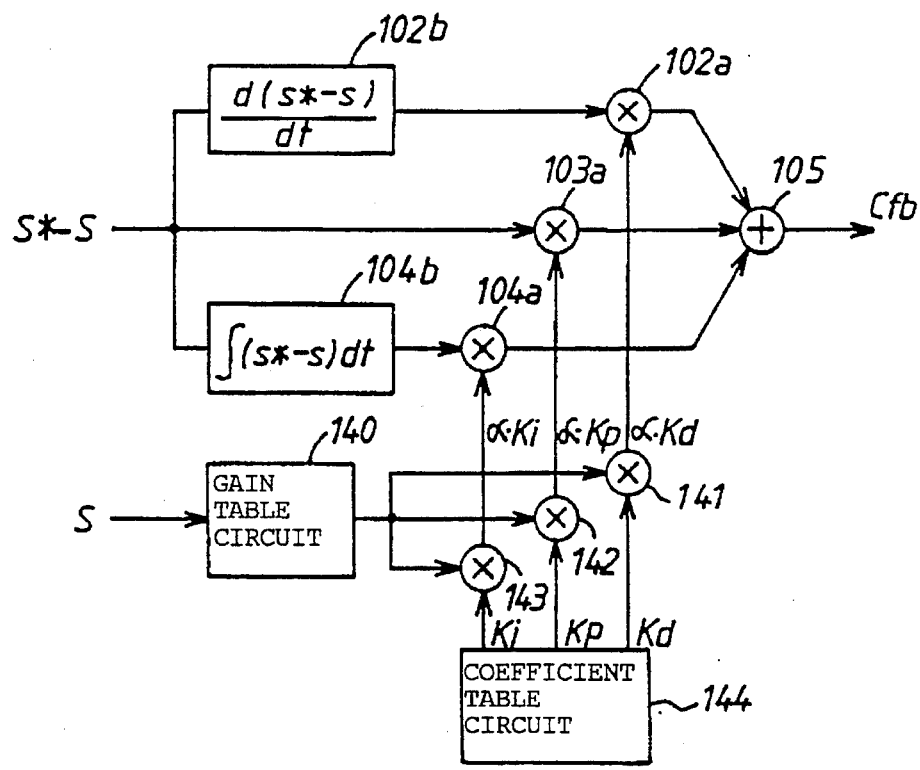
FIG. 11 is a block diagram of a second modification of the feedback control portion shown in FIG. 2.
Figure 12:
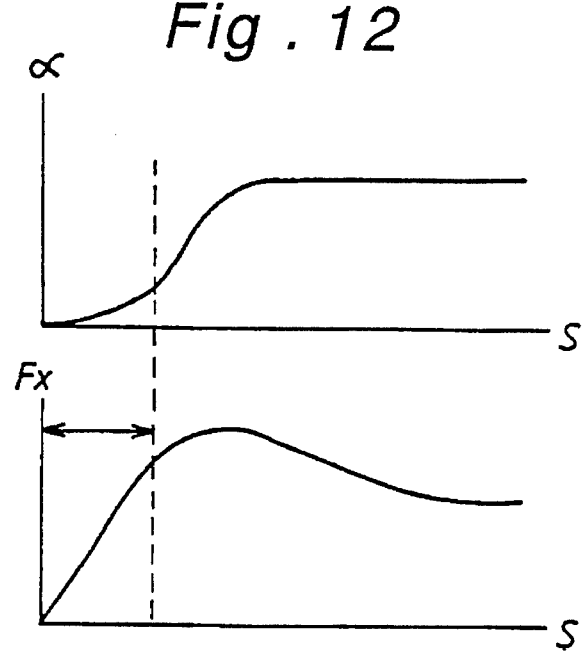
FIG. 12 is a graph showing a gain $\alpha$ of the feedback control pulse signal in relation to a slip ratio S in the feedback control.

With the modification, the coefficients Kp, Kd, Ki of a PID interpolation in the feedback control can be varied in accordance with a road surface condition. Thus, the feedback control is stabilized even if the road condition has changed.

b) Second Modification:

In a second modification of the embodiment, the differential control term calculator 102, proportional control term calculator 103 and integral control term calculator 104 are modified as shown in FIG. 11. In this modification, there is provided a gain table circuit 140 which is arranged to memorize a two dimensional map representing a feedback gain α in relation to an actual slip ratio S as shown in FIG. 12. The gain table circuit 140 includes an interpolator for interpolation of data read out from the two dimensional table as well as in the braking force calculation circuit 111. Multiplexers 141, 142, 143 are connected to the gain table circuit 140 to be applied with the interpolated gain α therefrom. The multiplexers 141, 142, 143 are connected to a coefficient table circuit 144 to multiply coefficients Kp, Kd, Ki applied therefrom by the interpolated gain α. Multiplexers 102a, 103a, 104a are connected to the multiplexers 141, 142, 143 to be applied with the multiplied values therefrom. Preferably, the coefficient table circuit 144 is arranged to produce the coefficients Kp, Kd, Ki in accordance with the road surface frictional coefficient µ, contact load Fz and slip angle β as in the first modification. Alternatively, the coefficient table circuit 144 may be arranged to produce the coefficients Kp, Kd, Ki each as a predetermined value as in the above embodiment.

With the second modification, the gain α is determined as a small value in a small region of the actual slip ratio S where the braking force for the feedforward control linearly changes. Thus, in a lower linear region of the actual slip ratio S, mainly the feedforward control is effected without any interference with the feedback control to quickly control each slip ratio of the road wheels to the target slip ratio S*. In a higher non-linear region of the actual slip ratio S, mainly the feedback control is effected to control each slip ratio of the road wheels to the target slip ratio S* in a stable condition.

Figure 13:
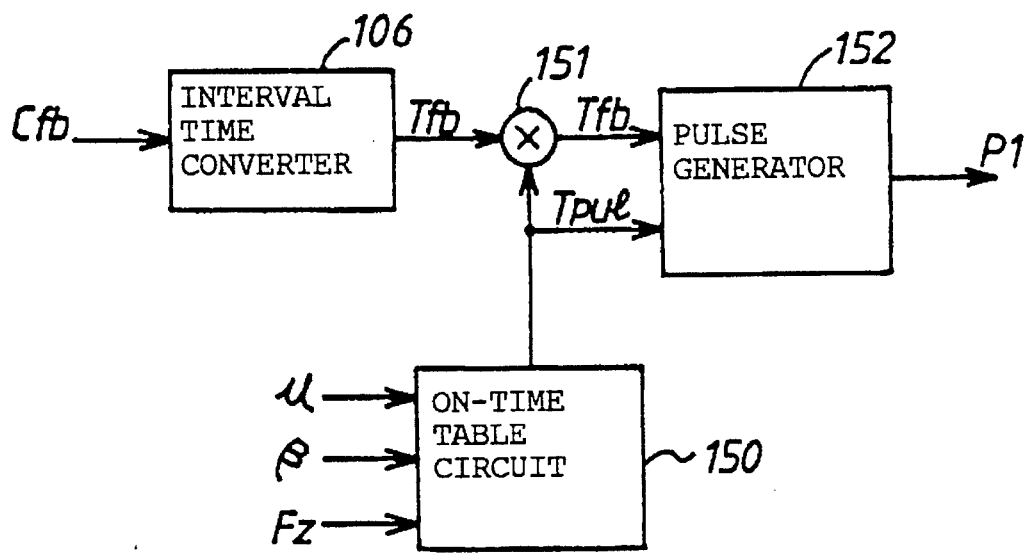
FIG. 13 is a third modification of the feedback control portion shown in FIG. 2.
Figure 14:
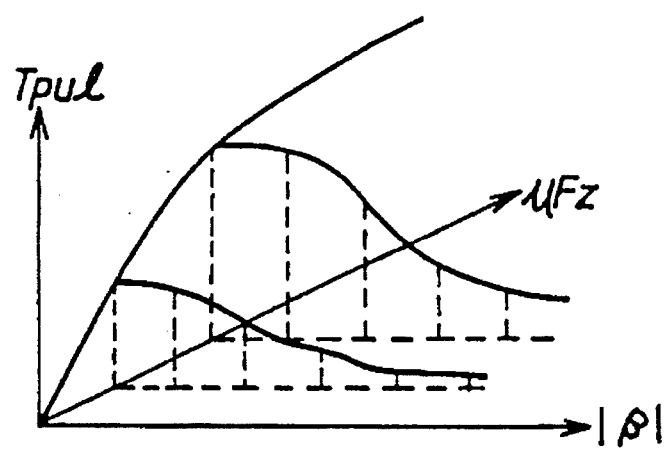
FIG. 14 is a graph showing a relationship among a multiplied value of a road surface frictional coefficient μ and a contact load Fz, a slip angle β and a pulse-on time Tpul of the control pulse.

Although in the second modification the multiplexers 141–143 have been adapted to multiply the gain α from the gain table circuit 140 by the coefficients Kp, Kd, Ki from the coefficient table circuit 144, the gain α may be multiplied by the output of the multiplexers 102a, 103a, 104a or the adder 105. Although in the second modification, the gain α has been determined on a basis of the actual slip ratio S, the gain α may be determined in accordance with the target slip ratio S*.

c) Third Modification:

In a third modification of the above embodiment, the interval time converter 106 and pulse generator 107 are partly modified as shown in FIG. 13. In this modification, there is provided an on-time table circuit 150 which is arranged to memorize a three dimensional map representing a pulse-on time (pulse width) Tpul in relation to the detected road surface frictional coefficient µ, the predetermined contact load Fz and the slip angle β as shown in FIG. 14. In addition, the on-time table circuit 150 includes a calculator for multiplying the road surface frictional coefficient µ by the contact load Fz and an interpolator for interpolation of an output of the table circuit 150. A multiplexer 151 and a pulse generator 152 are connected to the on-time table circuit 150 to be applied with a pulse signal indicative of a pulse-on time Tpul therefrom. The multiplexer 151 multiplies an interval time Tfb applied from the interval time converter 106 by the pulse-on time Tpul and applies the multiplied value to the pulse generator 152. When applied with the multiplied value from the multiplexer 151, the pulse generator 152 produces a control pulse signal P1 for feedback control in accordance with an interval time (pulse frequency) and pulse-on time Tpul defined by the compensated interval time Tfb.

Figure 15:
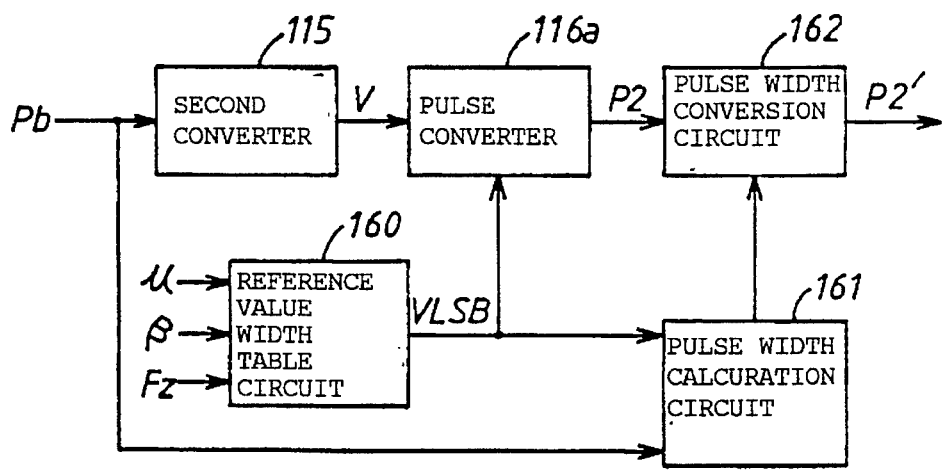
FIG. 15 is a block diagram of a modification of the feedforward control portion shown in FIG. 2.
Figure 16:
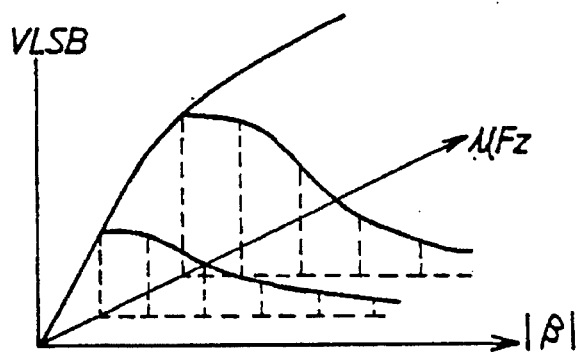
FIG. 16 is a graph showing a relationship among a multiplied value of a road surface frictional coefficient μ and a contact load Fz, a slip angle β and a reference value width VLSB of an amount of hydraulic fluid V for control of the occurrence of the pulse.
Figure 17:
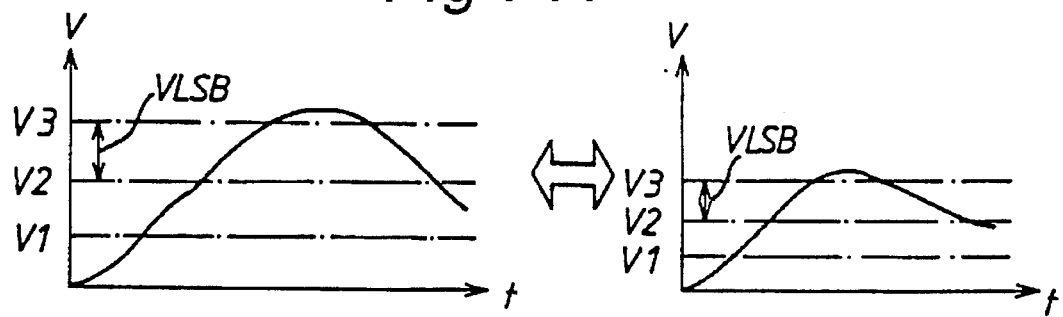
FIG. 17 is a time chart of for explanation of a pulse converter shown in FIG. 15.

In the third modification, the interval time and the pulse-on time of the control pulse signal P1 for the feedback are controlled in accordance with a road surface condition. Thus, in the case that the hydraulic braking pressure in the slave cylinders 32, 42, 52, 62 can be increased under a good condition of the road surface or cannot be increased under a bad condition of the road surface, a dynamic range of the braking pressure under the feedback control can be varied in accordance with a condition of the road.

d) Fourth Modification:

In a fourth modification of the above embodiment, the pulse converter 116 is modified as shown in FIG. 15. In this modification, there is provided a reference value width table circuit 160 arranged to memorize a three dimensional map representing a reference value width VLSB in relation to the detected road surface frictional coefficient μ, the predetermined contact load Fz and tire slip angle β as shown in FIG. 16. The reference value width table circuit 160 is designed as in the on-time table circuit 150 of the third modification to interpolate an output value of the table circuit 160 in accordance with a multiplied value of the road surface frictional coefficient μ and contact load Fz and the slip angle β. A pulse converter 116a is connected to the reference value width table circuit 160 to be applied with the reference value width VLSB therefrom for converting each width among reference values $V_1$, $V_2$, $V_3$ for comparison with the amount of hydraulic braking fluid V In proportion to the reference value width VLSB as shown in FIG. 17. The other function of the pulse converter 116a is substantially the same as that in the pulse converter 116.

A pulse width conversion circuit 162 is connected to the pulse converter 116a to be applied with the control pulse signal P2 therefrom and connected to a pulse width calculation circuit 161 to be applied a pulse width Twid therefrom for converting the pulse width of the control pulse signal P2 in proportion to the pulse width Twid. The converted pulse width is applied as a control pulse signal P2' to the pulse mixing circuit 121 in the above embodiment. The pulse width calculation circuit 161 is applied with electric signals respectively indicative of the hydraulic braking pressure Pb and pulse width Twid to execute calculation of the following equation (4) for calculating the pulse width Twid when the hydraulic braking pressure Pb is increased and to execute calculation of the following equation (5) for calculating the pulse width Twid when the hydraulic braking pressure Pb is decreased.

$$Twid = K \cdot VLSB \cdot (P_{L1} - Pb)^{-\frac{1}{2}} \quad (4)$$

$$Twid = K \cdot VLSB \cdot (Pd)^{-\frac{1}{2}} \quad (5)$$

In the equations (4) and (5), the character $P_{L1}$ represents a hydraulic pressure in the high pressure line L1, and the coefficient K represents a predetermined constant.

When the hydraulic braking pressure Pb is increased, the amount of hydraulic fluid in the slave cylinder 32 increases in proportion to a square root of a difference between the hydraulic pressure in the high pressure line L1 and the hydraulic pressure in the slave cylinder 32. When the hydraulic braking pressure Pb is decreased, the amount of hydraulic fluid in the slave cylinder 32 decreases in proportion to a square root of a difference between the hydraulic pressure in the slave cylinder 32 and the hydraulic pressure in the low pressure line L2. Thus, the pulse-on time for providing a necessary amount of hydraulic fluid in accordance with variation of the reference value width VLSB can be calculated by calculation of the equations (4) and (5).

Figure 18:
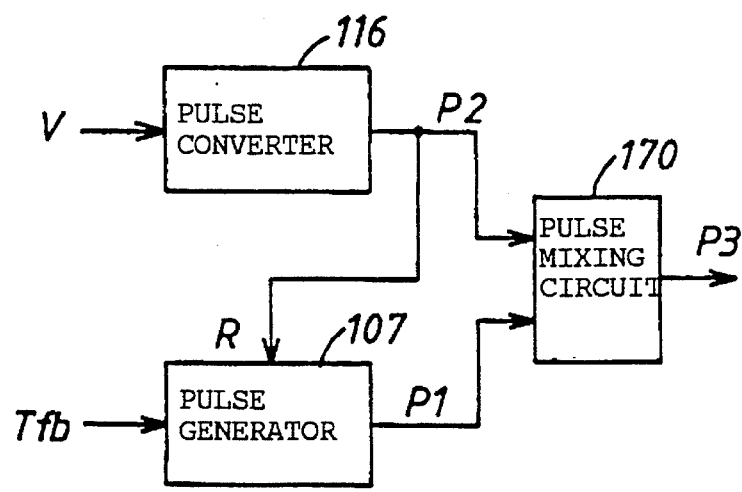
FIG. 18 is a block diagram of a modification of a control pulse generating portion shown in FIG. 2.
Figure 19:
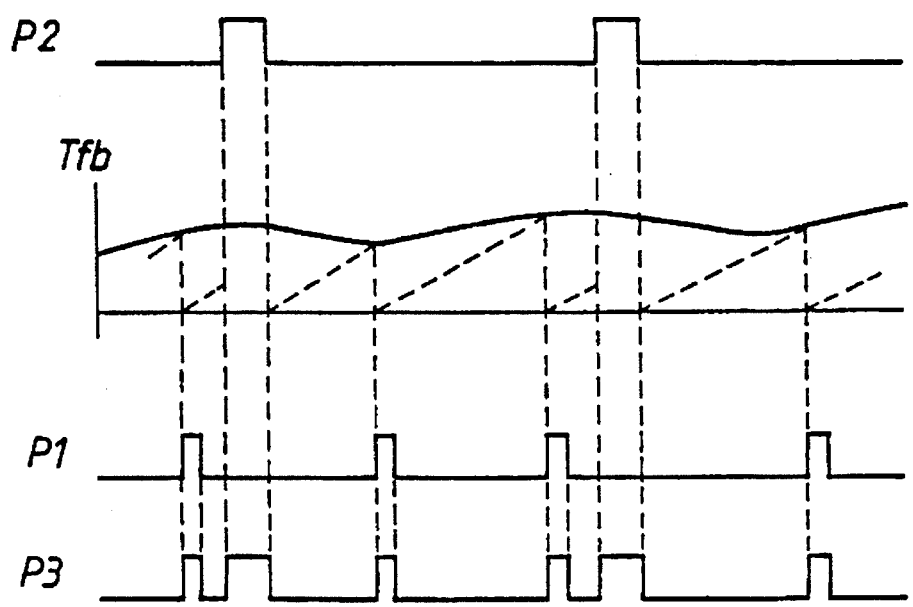
FIG. 19 is a time chart of control pulse signals P1, P2 and P3 in the modification shown in FIG. 18.

With the fourth modification, the pulse interval and pulse-on time of the control pulse signal P2 for the feedforward are controlled in accordance with a condition of the road surface. Thus, in the case that the hydraulic braking pressure in the slave cylinders 32, 42, 52, 62 can be increased under a good condition of the road surface or cannot be increased under a bad condition of the road surface, a dynamic range of the hydraulic braking pressure under the feedforward control can be varied in accordance with a condition of the road surface.

e) Fifth Modification:

In a fifth modification of the above embodiment, the pulse generator 107, pulse converter 116 and pulse mixing circuit 121 are modified as shown in FIG. 18. In this modification, the pulse generator 107 has an internal counter which is arranged to be reset in response to the control pulse signal P2 applied thereto from the pulse converter 116. The pulse mixing circuit 121 is replaced with a pulse mixing circuit 170 which is arranged to be applied with the control pulse signals P1 and P2 from the pulse converters 107 and 116. When applied with either one of the control pulse signals P1, P2, the pulse mixing circuit 170 produces the applied control pulse signal as a control pulse signal P3 at times t1, t4 shown in FIG. 19.

With the fifth modification, both the control pulse signals P1, P2 are not applied to the pulse mixing circuit 170 at the same time since the internal counter of pulse generator 107 is reset in response to the control pulse signal P2 from the pulse converter 116. Accordingly, both the control pulse signals can be mixed at the pulse mixing circuit 170 in a simple manner, and the pulse mixing circuit 170 can be provided in a simple construction. Since the number of mixed control pulse signals P3 is reduced, the changeover frequency of the solenoid valves 33, 34 is reduced. This is useful to enhance the durability of the solenoid valves 33, 34.

f) Further Modifications:

Although in the above embodiment and modifications the condition amount calculation portion 72, target slip ratio calculation portion 73, abnormal behavior detection portion 74, actual slip ratio calculation portion 75 and slip ratio control portion 100 each have been constructed by a hardware, they may be replaced with a software such as an appropriate microcomputer for effecting the identical function.

What is claimed is:

1. An electric control apparatus for a hydraulic brake control system of an automotive vehicle, comprising:

determination means for determining a target slip ratio of each road wheel of the vehicle in accordance with a movement condition of the vehicle;

detection means for detecting an actual slip ratio of each road wheel of the vehicle;

feedback control means for producing a feedback control signal indicative of a difference between the target slip ratio and the actual slip ratio and for controlling the hydraulic brake control system in response to the feedback control signal so that the actual slip ratio becomes identical with the target slip ratio, wherein the electric control apparatus further comprises feedforward control means for producing a feedforward control signal in accordance with the target slip ratio and mixing means for mixing the feedforward control signal with the feedback control signal and for controlling the hydraulic brake control system in accordance with the mixed control signal.

2. An electric control apparatus as claimed in claim 1, further comprising means for interpolating the feedback control signal in accordance with a road surface condition.

3. An electric control apparatus as claimed in claim 1, further comprising means for interpolating the feedforward control signal in accordance with a road surface condition.

4. An electric control apparatus as claimed in claim 1, further comprising means for decreasing a gain of the feedback control signal when the target slip ratio or the actual slip ratio is low and for increasing the gain of the feedback control signal when the target slip ratio or the actual slip ratio is high.

5. An electric control apparatus as claimed in claim 1, further comprising means for effecting mainly a feedforward control of the hydraulic brake control system under control of said feedforward control means when the target slip ratio or the actual slip ratio is low.

6. An electric control apparatus as claimed in claim 1, wherein said feedback control means includes a pulse generator for producing a first pulse signal the pulse interval of which is reduced in accordance with an increase of the feedback control amount, while said feedforward control means includes a pulse converter for producing a second pulse signal the pulse interval of which is reduced in accordance with an increase of variation speed of the feedforward amount, and wherein the production timing of the first pulse signal at said pulse generator is varied by the second pulse signal from said pulse converter in such a manner that the production timing of the first pulse signal does not coincide with the production timing of the second pulse signal.

* * * * *